Dec. 28, 1965   E. P. ABRAHAM ET AL   3,226,384
CEPHALOSPORIN $C_A$ DERIVATIVES
Filed Jan. 25, 1963
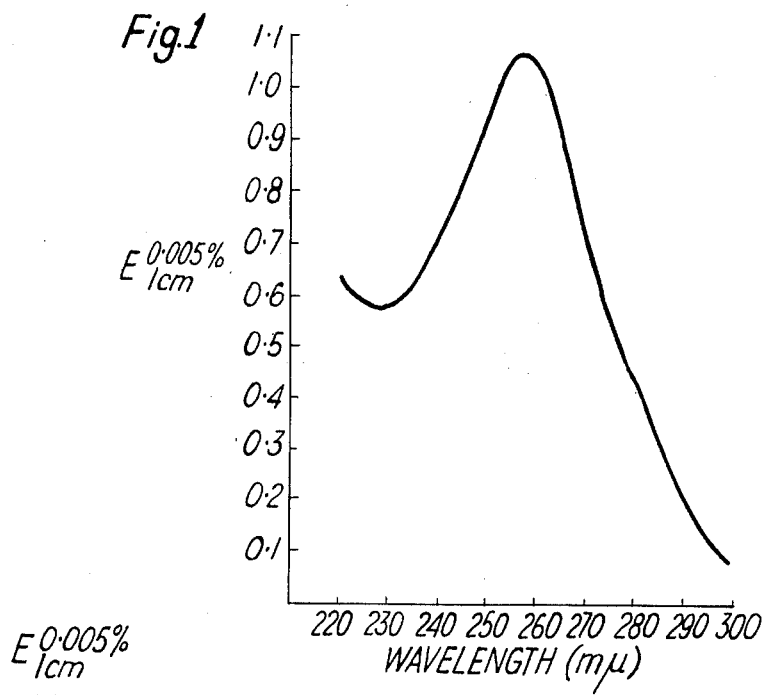
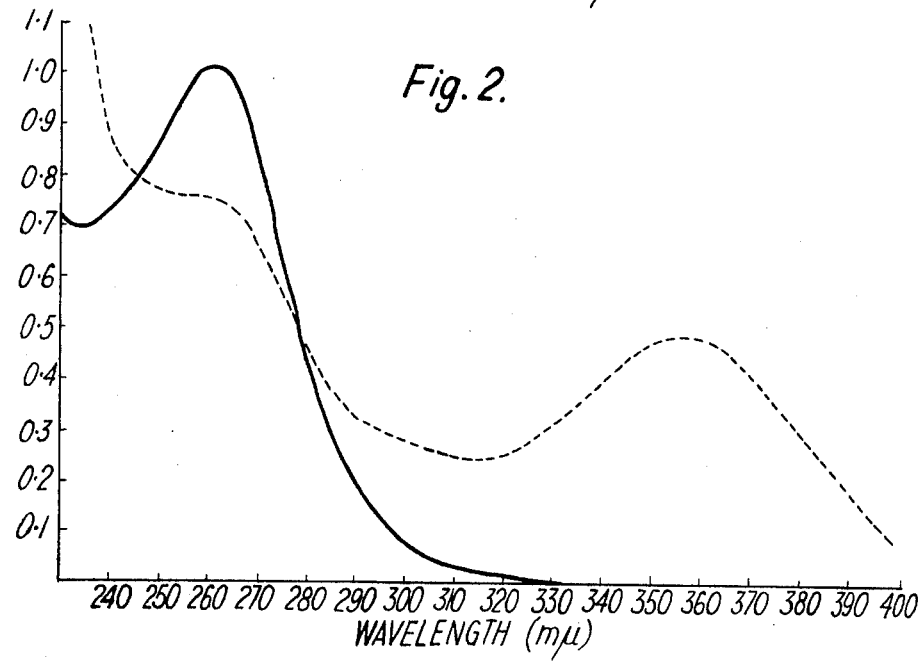
Inventors:
E. P. ABRAHAM
G. G. F. NEWTON
C. W. HALE
By: Wenderoth, Lind & Ponack
Attorneys United States Patent Office 3,226,384
Patented Dec. 28, 1965

3,226,384
CEPHALOSPORIN $C_A$ DERIVATIVES
Edward Penley Abraham and Guy Geoffrey Frederick Newton, Oxford, and Clifford William Hale, Clevedon, Somerset, England, assignors to National Research Development Corporation, London, England, a British corporation
Filed Jan. 25, 1963, Ser. No. 254,558
26 Claims. (Cl. 260—239.75)

This invention relates to transformation products of Cephalosporin C and a process for their preparation. This application is a continuation-in-part of co-pending application Serial No. 799,343, filed March 13, 1959 (now abandoned).

The object of the invention is to provide transformation products of Cephalosporin C which have activity against *Staph. aureus* and in some instances have an increased activity as compared with the acitivity of Cephalosporin C itself and which are useful, whether they have increased antibiotic activity or not, as intermediates in the synthesis of compounds having a similar type of activity to that of Cephalosporin C itself.

According to the present invention, therefore, there is provided a transformation product of Cephalosporin C having the structure

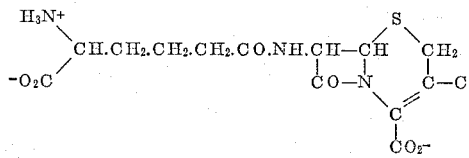

in which R represents a weak, tertiary, heterocyclic base linked to the —$CH_2$— group via a tertiary nuclear nitrogen hetero-atom.

The invention also includes salts of the said transformation products particularly in those cases where the heterocyclic base used has a second basic nitrogen atom (as in nicotine or amino-pyridine) or has a carboxyl substituent (as in picolinic acid or pyridine-dicarboxylic acid). In the case of the products having a second basic nitrogen atom, the salts will be acid addition salts of inorganic or organic acids, such as the hydrochlorides, acetates and other pharmaceutically acceptable acids while in the case of the products produced from the carboxy-substituted heterocyclic bases, the salts will usually be alkali metal or ammonium salts although any other suitable pharmaceutically acceptable bases may be used to form the carboxylic salts.

The salts of both types of transformation product prepared from heterocyclic bases containing either a second basic nitrogen atom or a carboxyl substituent will form substantially neutral solutions in water. The dicyclic ring system of the compounds has a similar steric structure to the corresponding part of Cephalosporin C obtained by fermentation, while the α-amino adipyl side chain may be D or L, but is preferably D, in form. The compounds of the invention are hereinafter referred to as Cephalosporin $C_A$ compounds.

Among the Cephalosporin $C_A$ compounds of the invention which have been found to be particularly useful is the compound in which R represents pyridine, hereinafter referred to as Cephalosporin $C_A$ (pyridine). This compound is relatively stable to penicillinase as compared with benzyl penicillin; it is relatively stable to cold dilute hydrochloric acid, losing no substantial activity on standing in cold 0.1 N hydrochloric acid for four hours; it has both a greater activity against *Staph. aureus* than against *Salm. typhi* and an activity against *Staph. aureus* which is several times the activity of Cephalosporin C itself;

and it shows an absorption band in the ultra-violet absorption spectrum similar to that of Cephalosporin C but having a maximum close to 257 mμ and an extinction $E_1$ $cm.^{1\%}$ at 257 mμ of 244.

R preferably represents a weak, tertiary, heterocylic base having, in its free form, a maximum dissociation constant value less than 9. Bases with a maximum dissociation constant less than 8, and especially less than 7, are particularly important. Useful Cephalosporin $C_A$ compounds include those in which R represents alkyl-substituted pyridines, such as 2,4,6-trimethyl pyridine and 4-ethyl-2-methyl pyridine; amino-substituted pyridines, such as 2-amino-pyridine and 2-amino-6-methyl pyridine; carboxylic acid-substituted pyridines, such as pyridine-2,3-dicarboxylic acid; hydroxy-substituted pyridines, such as 3-hydroxy pyridine; hydroxyalkyl-substituted pyridines, such as 2-pyridine-ethan-2-ol and 2-hydroxymethylpyridine; nicotine; nicotinamide; α,α-dipyridyl; quinoline; isonicotine acid; picolinic acid; pyrimidines; pyrazoles; thiazoles and sulphonamide derivatives thereof, such as sulphadiazine, sulphathiazole and sulpha-pyridine; and triazoles such as 4-amino-1,2,4-triazole.

The invention also provides a process for the preparation of Cephalosporin $C_A$ compounds which comprises treating Cephalosporin C in aqueous solution with a weak, tertiary, heterocyclic base for a prolonged period of time at a temperature in the range of about 30° C. to 50° C. and at a pH not exceeding 9, whereby the Cephalosporin C has the $OCOCH_3$ group removed from its side-chain and replaced by a molecule of the base, and recovering the Cephalosporin $C_A$ compounds thus produced from the reaction medium. The reaction is preferably carried out at a temperature in the range of about 37° C. to 50° C. and at a pH not exceeding 8, and usually not exceeding 7. At 50° C., the reaction will usually be nearing completion after about 18 hours, while at 37° C. a period of about 48 hours will be neded. The base is preferably in the form of a solution of a strength not less than 1 molar.

It will be appreciated that the reaction whereby Cephalosporin $C_A$ compounds are produced is a surprising one, involving as it does the elimination of a $OCOCH_3$ group as shown in the following reaction scheme illustrating the production of Cephalosporin $C_A$ (pyridine).

REACTION SCHEME

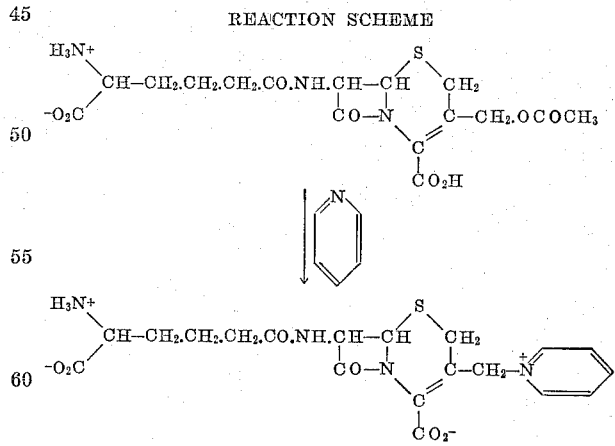

The Cephalosporin $C_A$ compounds can be recovered from the reaction medium by methods known per se, for example using ion exchange resins, chromatography or counter-current distribution techniques.

The following table illustrates the production of Cephalosporin $C_A$ compounds from Cephalosporin C on incubation for 48 hours at 37° C. in the listed solution; the crosses indicate the relative sizes of the inhibition zones when the incubated solution was subjected to electrophoresis on paper, followed by drying of the paper which was then placed on the surface of a nutrient agar plate seeded with *Staph. aureus*. Two separate zones of inhibition were noted owing ot the electrophoretic separation of the two antibiotics:

TABLE 1

| Solution in— | Cephalosporin $C_A$ formed: | Cephalosporin C remaining: |
|---|---|---|
| Water | 0 | X |
| M-pyridine acetate, pH 5 | XXXXX | XX |
| 0.3 M-pyridine acetate, pH 5 | XXXX | XX |
| 0.1 M-pyridine acetate, pH 5 | XX | XX |
| 0.01 M-pyridine acetate, pH 5 | X | XX |
| M-pyridine acetate, pH 7 | XXXXXX | |
| 0.25 M-pyridine acetate, pH 7 | XXXXX | XX |
| 0.3 M-pyridine sulphate, pH 5 | XXX | XX |
| 0.3 M-collidine acetate, pH 5 | X | XX |
| 0.3 M-collidine acetate, pH 7 | XX | XX |
| 0.3 M-quinoline acetate, pH 4.5 | XX | XX |

When electrophoresis was followed by paper chromatography in butanol-acetic acid-water, the pyridine derivative could be distinguished from the collidine and quinoline derivatives since the three compounds have slightly differing $R_f$ values. The nicotinic acid derivative is also separable from Cephalosporin C by electrophoresis on paper followed by paper chromatography.

Comparative experiments with other bases, such as sodium and ammonium acetate, failed to produce any Cephalosporin $C_A$ compounds.

Cephalosporin $C_A$ compounds are sensitive to alkali and their antibacterial activity tends to be destroyed when they are maintained in an alkaline medium, especially at a pH greater than 9.

As previously stated, Cephalosporin $C_A$ compounds are useful as intermediates in the synthesis of compounds having antibacterial activity of a type similar to that of Cephalosporin C itself. Thus, they can be converted by acid hydrolysis, as described in co-pending application Serial No. 45,364, to their nuclei and then N-acylated by treatment with an acid chloride, as described in co-pending application Serial Nos. 45,364 and 191,213, filed July 26, 1960, and April 30, 1962, respectively, to form N-acyl derivatives of their nuclei having antibacterial activity. The phenylacetyl derivative of the nucleus of Cephalosporin $C_A$ (pyridine) is one example of a compound which can be prepared in this way.

The following examples illustrate the invention.

EXAMPLE 1.—PREPARATION AND PURIFICATION OF CEPHALOSPORIN $C_A$ (PYRIDINE)

A solution of Cephalosporin C Na salt (1 g.) in water (50 ml.) was brought to pH 2.5 by the addition of Dowex 50X8 (H form3. About 1 g. of damp resin was required. The resin was removed by filtration and washed with a little water. Pyridine (8 ml.) was added to the combined filtrate and washing. The solution was kept at 46° C. for 18 hours and then freeze dried. The residue was dissolved in the minimum amount of water (about 2 ml.) and precipitated by the addition of acetone (about 50 ml.). The precipitate was centrifuged down and ground under dry acetone to form a pale buff-coloured powder. The powdered material was dissolved in water (about 2 ml.) and added to a column (9 cm. x 2 cm. diam.) of Dowex 1X10 (200–400 mesh, acetate form). Water was then allowed to flow through the column and the Cephalosporin $C_A$ (pyridine) emerged in the first 30 ml. of percolate. The latter was freeze-dried and the residue stirred with dry acetone. The resulting powder, freed from acetone in vacuo, weighed 250 mg. It showed an activity of 80μ/mg. against *Staph. aureus* and its ultra-violet absorption spectrum showed a maximum at 257 mμ with $E_{1cm.}^{1\%}$ 180. The product could be kept in a desiccator over $P_2O_5$, but was very hygroscopic in moist air.

A sample of this product (200 mg.) was dissolved in water (2 ml.) and the solution added to a column (5 cm. x 1 cm. diam.) of Dowex 50X8 (200–400 mesh; H form). The solution was applied to the column under slight air pressure and the column then washed rapidly with water (8 ml.). The resin was then removed from the column and stirred with water (about 25 ml.) while aqueous $NH_3$ was added (0.88 $NH_3$ diluted 1 to 4) until the pH rose to 6.9. The resin was filtered off and the clear filtrate freeze-dried. The residue was stirred with acetone, collected by centrifuging and dried in vacuo (118 mg.).

The product was an almost white non-hygroscopic powder with an activity of 110–120 μ/mg. against *Staph. aureus*. Its ultra-violet absorption spectrum showed a maximum at 257 mμ with $E_{1cm.}^{1\%}$ 244. (Found: C, 46.0; H, 6.2; N, 11.2; S, 5.8; $C_{19}H_{22}O_6N_4S$, 3.5. $H_2O$ requires C, 46.0; H, 5.9; N, 11.2; S, 6.4%.) When subjected to electrophoresis on paper at pH 5 or pH 7 it behaved as though it had no net charge and at pH 2.2 it migrated 3 cm. towards the cathode.

EXAMPLE 2.—PREPARATION OF CEPHALOSPORIN $C_A$ (NICOTINAMIDE)

Cephalosporin C Na salt (100 mg.) was dissolved in 5 ml. water and Dowex 50X8 (H form) was added to the stirred solution until the pH fell to 2.6. (About 70 mg. of resin was required.) The resin was removed by filtration and washed with a little water. Nicotinamide (610 mg.) was dissolved in the combined filtrate and washing, when the pH rose to about 4.8. The solution was kept at 37° C. for 48 hr. and then freeze-dried. The residue was stirred three times with 10 ml. acetone (to extract remaining nicotinamide) and the insoluble material separated each time by centrifuging and finally freed from acetone by drying. This material (74 mg.) was dissolved in about 1 ml. water and added to a column (10 cm. x 1 cm. diam.) of Dowex 1X10 (200–400 mesh; acetate form). Water was allowed to pass through the column and 1 ml. fractions collected. Fractions 3 to 6, which contained ninhydrin-positive material, were combined and freeze-dried. The product was stirred with 2 ml. acetone, separated from the acetone by centrifuging, and dried in vacuo (28 mg.). It showed an activity of 50μ/mg. against *Staph. aureus* and 12μ/mg. against *Salm. typhi*. It gave a single spot (detected by bioautograph, ninhydrin, fluorescence with methylethylketone-$NH_3$, or absorption of ultra-violet light) when chromatographed on paper in system A ($R_f$ 0.04), or in system B ($R_f$ 0.45) and a single spot corresponding to a substance with no net charge when subjected to electrophoresis on paper at pH 7.0. It migrated 3 cm. towards the cathode on electrophoresis at pH 2.2.

EXAMPLE 3.—PRODUCTION OF MEMBERS OF THE CEPHALOSPORIN $C_A$ FAMILY

Cephalosporin C Na salt (10 mg.) was dissolved in aqueous solution (0.50 ml.) of the base used. The concentration of the base was from 0.1 to 2.0 M and the pH of the solution was from 4.5 to 7.0, being adjusted (if necessary) to a value within this range by the addition of acetic acid. In the case of sulphapyridine and sulphathiazole, whose solubility in water is low, the reaction was carried out in 50% (v. v.) dimethylformamide. The mixture was kept at 37° C. and after different intervals (usually 24 and 48 hrs.) 5 μl. samples were spotted on to paper from analysis by electrophoresis and/or chromatography. Bioautographs revealed the Cephalosporin $C_A$ and remaining Cephalosporin C. Spraying with ninhydrin revealed Cephalosporin $C_A$, Cephalosporin C and usually also some 2 - (4-amino-4-carboxy-butyl) thiazole-4-carboxylic acid (Jeffery, Abraham and Newton, 1960).

*Estimations of relative antibacterial activities after paper chromatography or electrophoresis*

Semi-quantitative estimates of the relative activities of members of the Cephalosporin $C_A$ family against *Staph. aureus* and *Salm. typhi* were obtained by the application of techniques similar to those used for the penicillins by Goodall and Levi (1947). A solution (10 μl.) containing a mixture of Cephalosporin C and a Cephalosporin $C_A$ compound was spotted onto a strip of Whatman No. 1 paper in 6-fold replication. The components were separated by chromatography or electrophoresis and, after the solvent or buffer had been evaporated in a stream of air, the paper strip was applied to nutrient agar sheets (x) seeded with one of the test organisms. At the same time, paper strips bearing standard spots of Cephalosporin C in three graded amounts, each in 6-fold replication, were applied to the sheet in such a way as to distribute the resulting inhibition zones at random about the agar sheet. After 15 min. the papers were removed and the agar sheets incubated overnight. The diameters of the inhibition zones were measured at right-angles to the direction of the original electrophoretic flow or irrigation flow and the mean diameters of the standard spots plotted against the logarithm of the concentration. The relative activity of test spots was determined by applying their mean diameters to the graph so formed. The accuracy of the method was not high and assumed a parallelism between log concentration/zone diameter for both Cephalosporin C and the members of the $C_A$ family which may not exist. However, it gave an indication of the relative activities of the derivatives against the two organisms, compared with the activity of Cephalosporin C, before they had been isolated in quantity from reaction mixtures.

The process was carried out with the bases listed in the following table, which also lists certain of the characterising properties of the Cephalosporin $C_A$ compound produced.

TABLE 2.—ELECTROPHORETIC MOBILITY, $R_f$ VALUES, AND RELATIVE ANTIBACTERIAL ACTIVITIES OF CEPHALOSPORIN $C_A$ DERIVATIVES

| Cephalosporin $C_A$ derived from— | Electrophoretic mobility* | $R_{ceph}$ C† | Activity ratio‡ |
|---|---|---|---|
| Nicotine | −1.4 | 0.16 | 5 |
| 2-aminopyridine | −0.6 | 0.29 | >30 |
| 2-amino-6-methyl pyridine | −0.64 | 0.6 | >30 |
| α,α-dipyridyl | | | >1 |
| Pyridine | −0.4 | 0.31 | 10 |
| Nicotinamide | −0.4 | 0.3 | 4 |
| 2,4,6-trimethylpyridine | −0.4 | 0.54 | >1 |
| 2-hydroxymethylpyridine | −0.4 | 0.36 | >1 |
| Quinoline | −0.4 | 0.58 | >1 |
| Sulphapyridine | +0.25 | 0.55 | >1 |
| Sulphadiazine | +0.25 | 0.62 | >1 |
| Sulphathiazole | +0.25 | | >1 |
| 3-hydroxypyridine | +0.75 | 0.36 | 5 |
| Isonicotinic acid | +0.55 | 0.2 | 1.3 |
| Nicotinic acid | −1.0 | 0.23 | 0.94 |
| Picolinic acid | +0.75 | 0.36 | 0.2 |
| Pyridine-2,3-dicarboxylic acid | +3.2 | 0.33 | 0.05 |
| 2-pyridine-2-ethanol | | | >1 |

*The figure given is the distance travelled by the derivative relative to that travelled by Cephalosporin C under similar conditions (pH 7.0 in collidine acetate buffer, 17 v./cm., 2.5 hr.). A plus sign means that the derivative migrated towards the anode (negative charge at pH 7); a minus sign indicates migration towards the cathode. Substances with no net charge at pH 7.0 moved towards the cathode approximately 0.4 times the distance that Cephalosporin C moved towards the anode.

†The figures represent the distances travelled by the derivatives relative to that travelled by Cephalosporin C in the butan-1-ol-acetic acid–water.

‡The figures represent the quotients (antibacterial activity against *Staph. aureus* antibacterial activity against *Salm. typhi*). The quotient for Cephalosporin C is assumed to be one.

EXAMPLE 4

Crystalline Cephalosporin C sodium salt (100 mg.) was dissolved in water (5 ml.). A cation exchange resin, known under the registered trademark "Dowex" 50X8 (hydrogen form, 200–400 mesh) was added until the pH of the solution fell to 2.6 (about 28 mg. of damp resin was required). By this procedure, the sodium ion was adsorbed on the resin; the resulting supernatant solution contained Cephalosporin C free acid. After removal of the resin, 0.38 ml. of pyridine was added to the solution, so that the latter was approximately molar with respect to pyridine and its pH had risen to about 6.5. The solution was then kept at 37° C. in a glass-stoppered tube for 48 hours. Samples (100 μg.) were removed at different times and subjected to electrophoresis on paper at pH 7. The paper was placed on plates seeded with *Staph. aureus* to determine the relative amounts of neutral Cephalosporin $C_A$ compound formed and acidic Cephalosporin C remaining. The diameters of the inhibition zones were as follows:

TABLE 3

| Time (hours) | Cephalosporin $C_A$ | Cephalosporin C |
|---|---|---|
| 0 | 0 | 29 |
| 3 | 24 | 28 |
| 24 | 35 | 28 |
| 48 | 36 | 18 |

After 48 hours the solution was freeze-dried and the residue stirred twice with 5 ml. of acetone and redried. The solid (78 mg.) was then dissolved in 1 ml. of water and added to the top of a column of the anion exchange resin Dowex 1X10 (acetate form) (100 cm. x 1 cm. diam.). The column was eluted with water and 1 ml. fractions collected. Cephalosporin $C_A$ (pyridine) was eluted in fractions 2, 3 and 4, leaving the remaining Cephalosporin C, and other acidic material, adsorbed in the column. The eluted solution of Cephalosporin $C_A$ (pyridine) was freeze-dried and the residue stirred with acetone and dried. The product (24 mg.) showed an activity of 90 units/mg. against *Staph. aureus*. It behaved as a neutral substance when subjected to electrophoresis on paper at pH 7 and showed an $R_f$ value of 0.06 when chromatographed on paper in butanol-acetic acid-water.

EXAMPLE 5

Cephalosporin C in the form of its free acid was heated with a twice molar solution of pyridine for 18 hours; the Cephalosporin $C_A$ (pyridine) obtained was isolated in the manner described in Example 4.

The following illustrates methods useful for the purification of Cephalosporin $C_A$ (pyridine) thus obtained:

*By ion exchange chromatography.*—Cephalosporin $C_A$ (pyridine) can be separated from Cephalosporin C by passing a mixture of the substances down a column of an anion exchange resin (such as Amberlite IR–4B) in acetate form. Cephalosporin $C_A$ (pyridine) rapidly emerges from the column whereas Cephalosporin C is adsorbed.

Further purification of Cephalosporin $C_A$ (pyridine) can be achieved by chromatography on a cation exchange resin such as Dowex 50. For example, 48 mg. of the crude Cephalosporin $C_A$ (pyridine) (4.8 units/mg. against *Staph. aureus*) was chromatographed in 0.2 N-ammonium acetate buffer, pH 4.5, on a column of Dowex 50X4 (45 cm. x 0.9 cm. diam.) in equilibrium with the buffer. The column was eluted with 0.2 N-ammonium acetate and 2 ml. fractions were collected every 20 minutes. Cephalosporin $C_A$ (pyridine) was found in fractions 46–54, which were combined and freeze-dried. The product showed an activity of somewhat more than 30 units/mg. against *Staph. aureus* and 3 units/mg. against *Salm. typhi*.

*By counter-current distribution.*—Cephalosporin $C_A$ (pyridine) can be purified by counter-current distribution in the phenol-carbon tetrachloride-aqueous acetic acid solvent system described by Newton and Abraham (Biochem. J., 1956, 62, 651) for the purification of Cephalosporin C. For example, a crude mixture of Cephalosporin C and Cephalosporin $C_A$ (pyridine) was first subjected to 100 transfers in this system, using the "fundamental procedure" and with an upper phase 1.5 times the volume of the lower phase. This was followed by a further 150 transfers using single withdrawal of the upper layer, and finally by 100 transfers using single withdrawal from both ends of the machine [see Craig and Post (Anal. Chem. 1949, 21, 500) for details of this procedure]. The resulting upper layers (first withdrawn series) contained Cephalosporin C and the lower layers (second withdrawn series) contained Cephalosporin $C_A$ (pyridine) in fractions 33–81. (The peak was at tube 48.) Fractions 40–72 were combined, 1 volume of water added, and the mixture shaken once with 4 volumes of carbon tetrachloride and 3 times with 3 volumes of benzene. The aqueous phase was brought to pH 3.1 by the addition of 0.1 ml. of pyridine, concentrated to a small volume by freeze-drying and Cephalosporin $C_A$ (pyridine) then precipitated by the addition of a large volume of acetone. The product showed an activity of 50 units/mg. against *Staph. aureus* and 4.6 units/mg. against *Salm. tpyhi*. (Cephalosporin C shows an activity of 8–10 units/mg. against both organisms.)

The properties of Cephalosporin $C_A$ (pyridine) may be briefly summarised as follows:

The activity of Cephalosporin $C_A$ (pyridine) against *Staph. aureus* is 8–10 times as great as its activity against *Salm. typhi*. Its activity against *Staph. aureus* is at least ten times as great as that of Cephalosporin C.

Cephalosporin $C_A$ (pyridine) behaves as a neutral substance when subjected to electrophoresis on paper at pH 7. On paper chromatograms in butanol-acetic acid-water (4:1:4 by vol.) it shows an $R_f$ value of about 0.06.

EXAMPLE 6.—CEPHALOSPORIN $C_A$ (SULPHAPYRIDINE)

Sulphapyridine was dissolved in N,N'-dimethylformamide (60 mg./ml.) and an equal volume of a solution of Cephalosporin C sodium salt in water (40 mg./ml.) was added. The mixture (pH 6.2 with a glass electrode) was heated at 37° C. for four days. Samples (10 μl.) were taken at 24 hr. intervals and subjected to ionophoresis in collidine acetate buffer (pH 7.0) on paper for 3–4 hours at 17 volts/cm. The presence of Cephalosporin $C_A$ (sulphapyridine) was detected by making a bioautograph (as described hereinbelow) of the ionogram. Cephalosporin $C_A$ (sulphapyridine), carrying a negative charge at pH 7, could readily be distinguished from both of the reactants since the unchanged sulphonamide was neutral at pH 7 and Cephalosporin C migrated towards the anode approximately two and a half times as fast as the modified product.

Bioautographs are obtained by placing the paper sheet, after chromatography or ionophoresis, on to agar jelly seeded with a suitable test organism. After the paper has been in contact with the jelly for about ½ hour it is removed and the seeded jelly is incubated at 37° C. overnight. The following morning, the areas in the jelly into which any antibiotic has diffused from the paper, are seen as clear zones of inhibition (of the growth of the test organism) against the opaque background where the organism has grown.

EXAMPLE 7.—CEPHALOSPORIN $C_A$ (SULPHADIAZINE)

A sulphadiazine-modified Cephalosporin C was produced by following the procedure described in Example 6 except that the sulphapyridine was replaced by sulphadiazine and the mixture was heated at 37° for 48 hours.

EXAMPLE 8.—CEPHALOSPORIN $C_A$ (SULPHATHIAZOLE)

A sulphathiazole-modified Cephalosporin C was produced by following the procedure of Example 6, except that the sulphapyridine was replaced by sulphathiazole.

Cephalosporin $C_A$ (sulphapyridine) and Cephalosporin $C_A$ (sulphadiazine) were separated from both reactants by paper chromatography using an n-butanol-acetic acid-water (4:1:4) solvent. With this solvent the following $R_f$ values were obtained: Cephalosporin C, $R_f$ 0.2 and sulphapyridine, $R_f$ 0.8. Cephalosporin $C_A$ (sulphapyridine) and Cephalosporin $C_A$ (sulphadiazine) each had $R_f$ 0.24; the sulphonamide-modified compounds are separable from Cephalosporin C and unchanged sulphonamide by ionophoresis followed by paper chromatography.

Using the techniques described in Example 4 above, it was found that the amount of Cephalosporin $C_A$ (sulphonamide) increased steadily during the first 48 hours, further increases were observed up to 96 hours, after which time little change was noted. Cephalosporin $C_A$ (sulphonamide) compounds can be shown to contain the substituted aniline group, which is an essential part of all of the sulphonamides, by spraying the paper ionograms or chromatograms first with a dilute solution of nitrous acid and then with a 1% solution of α-naphthylamine in 75% acetic acid. Aniline derivatives when treated in this way give brilliant red azo-dyes. The Cephalosporin $C_A$ (sulphonamide) compounds and the unchanged sulphonamides gave strongly positive diazo reactions after the treatment with nitrous acid, while Cephalosporin C itself gave a negative result. In the case of the Cephalosporin $C_A$ (sulphonamide) compounds, one of the red spots on the chromatograms due to the azo dye coincided exactly with one of the areas on the paper which showed an antibacterial zone on the bioautograph.

When bioautographs of paper ionograms or chromatograms were made using more than one test organism, it was found that the new Cephalosporin $C_A$ (sulphonamide) compounds were much more active against *Staph. aureus* than *Salm. typhi*. However, in contrast to the sulphonamides themselves, the new compounds showed definite activity against *Salm. typhi*.

EXAMPLE 9

A 10% aqueous solution of Cephalosporin C sodium salt was converted to the free acid with excess Dowex 50X8, 200–400 mesh resin as described in Example 4. To 2 ml. of the resulting aqueous solution was added 272 mg. pyrazole, and the solution formed was allowed to stand at room temperature for 16 hours. After centrifugation and lyophilisation of the supernatant liquid, the residue was triturated with acetone to give 190 mg. white solid. Paper electrophoresis at pH 4.5 (pyridine-acetic acid buffer) at 12 volts/cm. showed the presence of a strong blue fluorescent spot (which ran toward the positive electrode approximately as far as Cephalosporin C) weakly active against *B. subtilis* on plate assay. A paper chromatogram of the product (70% isopropanol-water) showed a spot corresponding to residual Cephalosporin C at $R_f$ 0.48 and an ultraviolet-blue fluorescent spot at $R_f$ 0.54, both ninhydrin positive and inhibiting *B. subtilis* on plate assay.

EXAMPLE 10

Cephalosporin C free acid was prepared according to Example 4. A solution of 1.0 g. in 5 ml. of water, 3.5 ml. or dioxane and 1.5 ml. of 4-ethyl-2-methyl-pyridine was heated under nitrogen at 65° C. for 16 hours. The reaction mixture was then lyophilised to complete dryness, triturated with acetone and the acetone discarded. The residue (950 mg.) was dissolved in water and passed over a column (22 cm. x 1.7 cm. diameter) of Dowex 1X10 resin (acetate form). Seventy-five ml. of water was used as the eluant. After lyophilisation, 157 mg. of the 4-ethyl-2-methylpyridinium derivative was obtained. It behaved as a neutral substance on electrophoresis with a pH 4.5 pyridine/acetic acid buffer. The activity of this analogue was 4.5 times that of Cephalosporin C against *Staph. aureus* (sensitive) and 3.9 times that of Cephalosporin C against the resistant Staph. 2957.

EXAMPLE 11

A solution of 132 mg. Cephalosporin C sodium salt and 370 mg. 4-amino-1,2,4-triazole in 1.2 ml. water was kept at 65° C. for 6 hours and then lyophilised to give a grey solid after trituration with acetone.

Paper electrophoresis as in Examples 8 and 10 showed the presence of a weakly inhibiting (vs. *B. subtilis*) blue fluorescent (under ultraviolet light) electrically neutral single component with no evidence of residual Cephalosporin C. This product moved toward the negative electrode slightly less rapidly than Cephalosporin $C_A$ (pyridine) and gave a positive ninhydrin test.

Cephalosporin $C_A$ compounds, like Cephalosporin C, are more stable than benzyl-penicillin to a highly purified preparation of penicillinase from *Bacillus cereus*. Thus, a purified preparation of the Cephalosporin $C_A$ (pyridine) lost no significant activity (tested after 2 hours at 37° C.) in the presence of a concentration of the penicillinase which brought about complete inactivation of a similar weight of benzylpenicillin.

The benzylpenicillin was also completely inactivated under these conditions when the concentration of the enzyme was reduced to one tenth.

The Cephalosporin $C_A$ compound prepared from nicotinic acid has a similar antibiotic activity against *Staph. aureus* and *Salm. typhi*.

In vivo tests have been carried out on mice to establish the chemotherapeutic activity and non-toxic character of the Cephalosporin $C_A$ compounds.

In these tests a number of mice were infected with doses of Streptococci and some of the infected mice were used as controls. All of the control mice succumbed within 24 hours of infection thus demonstrating the lethal character of the induced infection.

The remaining infected mice were each given a subcutaneous injection of 0.13 mg. of Cephalosporin $C_A$ (pyridine) and these injections were repeated at intervals of three hours so that each mouse received a total of nine injections; the series of injections provided complete protection to all of the mice tested and thus demonstrated the complete protection afforded against a lethal infection of Streptococci.

Three mice, each weighing 20 g., all survived an intravenous injection of 40 mg. of Cephalosporin $C_A$ (pyridine) thus demonstrating the very low acute toxicity of the compound for mice.

In the accompanying drawings—

FIGURE 1 is the ultraviolet absorption spectrum of Cephalosporin $C_A$ (pyridine) in water, and FIGURE 2 is the ultraviolet absorption spectrum of Cephalosporin $C_A$ (nicotinamide) in water shown in full line and showing in a dotted line the ultraviolet absorption spectrum of that compound after reduction with sodium dithionite. The curve shown in dotted lines is typical of the ultraviolet absorption spectrum of quaternary nicotinamide derivatives.

We claim:

1. A compound selected from the group consisting of Cephalosporin $C_A$ (tertiary base) wherein the base is a heterocyclic, weak, tertiary base having a cyclic structure containing at least one nitrogen heteroatom, linked to $CH_2$ via a nitrogen heteroatom, pharmaceutically acceptable non-toxic salts thereof with organic and inorganic acids, and pharmaceutically acceptable non-toxic alkali and alkaline earth metal salts of said base.

2. A compound according to claim 1 wherein the base has a maximum dissociation constant of less than 8.

3. The compound Cephalosporin $C_A$ (pyridine) wherein pyridine is linked to $CH_2$ via the nitrogen heteroatom.

4. The compound Cephalosporin $C_A$ (nicotinamide) wherein the nicotinamide is linked to $CH_2$ via the nitrogen heteroatom.

5. The compound Cephalosporin $C_A$ (sulphapyridine) wherein the sulphapyridine is linked to $CH_2$ via the nitrogen heteroatom.

6. The compound Cephalosporin $C_A$ (sulphathiazole) wherein the sulphathiazole is linked to $CH_2$ via the nitrogen heteroatom.

7. The compound Cephalosporin $C_A$ (4-amino-1,2,4-triazole) wherein the 4-amino-1,2,4-triazole is linked to $CH_2$ via a nitrogen heteroatom.

8. The compound Cephalosporin $C_A$ (nicotine) wherein the nicotine is linked to $CH_2$ via a nitrogen heteroatom.

9. The compound Cephalosporin $C_A$ (2-amino-pyridine) wherein the 2-amino-pyridine is linked to $CH_2$ via a nitrogen heteroatom.

10. The compound Cephalosporin $C_A$ (2-amino-6-methyl-pyridine) wherein the 2-amino-6-methyl-pyridine is linked to $CH_2$ via a nitrogen heteroatom.

11. The compound Cephalosporin $C_A$ ($\alpha,\alpha'$dipyridyl) wherein the $\alpha,\alpha'$dipyridyl is linked to $CH_2$ via a nitrogen heteroatom.

12. The compound Cephalosporin $C_A$ (2,4,6-trimethylpyridine) wherein the 2,4,6-trimethylpyridine is linked to $CH_2$ via a nitrogen heteroatom 13. The compound Cephalosporin $C_A$ (4-ethyl-2-methylpyridine) wherein the 4-ethyl-2-methylpyridine is linked to $CH_2$ via a nitrogen heteroatom.

14. The compound Cephalosporin $C_A$ (2-hydroxymethylpyridine) wherein the 2-hydroxymethylpyridine is linked to $CH_2$ via a nitrogen heteroatom.

15. The compound Cephalosporin $C_A$ (quinoline) wherein the quinoline is linked to $CH_2$ via a nitrogen heteroatom.

16. The compound Cephalosporin $C_A$ (sulphadiazine) wherein the sulphadiazine is linked to $CH_2$ via a nitrogen heteroatom.

17. The compound Cephalosporin $C_A$ (3-hydroxypyridine) wherein the 3-hydroxypyridine is linked to $CH_2$ via a nitrogen heteroatom.

18. The compound Cephalosporin $C_A$ (isonicotinic acid) wherein the isonicotinic acid is linked to $CH_2$ via a nitrogen heteroatom.

19. The compound Cephalosporin $C_A$ (nicotinic acid) wherein the nicotinic acid is linked to $CH_2$ via a nitrogen heteroatom.

20. The compound Cephalosporin $C_A$ (picolinic acid) wherein the picolinic acid is linked to $CH_2$ via a nitrogen heteroatom.

21. The compound Cephalosporin $C_A$ (pyridine-2,3-dicarboxylic acid) wherein the pyridine-2,3-dicarboxylic acid is linked to $CH_2$ via a nitrogen heteroatom.

22. The compound Cephalosporin $C_A$ (2-pyridine-2-ethanol) wherein the 2-pyridine-2-ethanol is linked to $CH_2$ via a nitrogen heteroatom.

23. A process for the preparation of a Cephalosporin $C_A$ compound of claim 1 which comprises treating Cephalosporin C in aqueous solution with a heterocyclic, weak, tertiary base having a cyclic structure containing at least one nitrogen heteroatom for a prolonged period of time at a temperature in the range of about 30° C. to 50° C. and at a pH not exceeding 7 whereby the Cephalosporin C has the

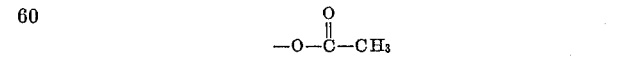

group removed from its side chain and replaced by a molecule of the base, and recovering the Cephalosporin $C_A$ thus produced from the reaction medium.

24. A process according to claim 23 in which the base is pyridine, the temperature is about 37° C. and the time is about 48 hours.

25. A process according to claim 23 wherein the pH is between 7 and 9.

26. A process according to claim 25 in which the base is pyridine, the temperature is about 37° C. and the time is about 48 hours.

(References on following page)

References Cited by the Examiner

FOREIGN PATENTS 641,604  5/1962  Canada.
661,357  11/1951  Great Britain.

OTHER REFERENCES

Abraham et al.: Ciba Foundation Symposium on Amino Acids and Peptides With Antimetabolic Activity, pages 205–222 (1958).

Abraham: Pharmacological Reviews, vol. 14, pp. 473–500, pp. 484–485 relied on, 1962.

Burger: Medicinal Chemistry, pages 46–47 (1960).

Hale et al.: Biochemical Journal, vol. 79, pp. 403, 408, 1961.

Jeffery et al.: Biochemical Journal, vol. 81, pp. 591–596, 1961.

Newton et al.: Biochemical Jour. vol. 62, pages 651–658 (1956).

Wertheim: Textbook of Organic Chemistry, pages 763–764 (1945).

NICHOLAS S. RIZZO, *Primary Examiner.*